United States Patent
Lee et al.

(10) Patent No.: US 11,918,978 B2
(45) Date of Patent: Mar. 5, 2024

(54) METHOD OF PREPARING SUPERABSORBENT POLYMER

(71) Applicant: LG Chem, Ltd., Seoul (KR)

(72) Inventors: Seul Ah Lee, Daejeon (KR); Gicheul Kim, Daejeon (KR); Dae Woo Nam, Daejeon (KR); Ki Hyun Kim, Daejeon (KR); Jun Kyu Kim, Daejeon (KR); Young Jae Hur, Daejeon (KR)

(73) Assignee: LG Chem, Ltd. (KR)

( * ) Notice: Subject to any disclaimer, the term of this patent is extended or adjusted under 35 U.S.C. 154(b) by 789 days.

(21) Appl. No.: 16/982,292

(22) PCT Filed: Dec. 10, 2019

(86) PCT No.: PCT/KR2019/017396
§ 371 (c)(1),
(2) Date: Sep. 18, 2020

(87) PCT Pub. No.: WO2020/122559
PCT Pub. Date: Jun. 18, 2020

(65) Prior Publication Data
US 2021/0023529 A1 Jan. 28, 2021

(30) Foreign Application Priority Data

Dec. 10, 2018 (KR) .................. 10-2018-0158524
Dec. 9, 2019 (KR) .................. 10-2019-0163106

(51) Int. Cl.
| | | |
|---|---|---|
| C08F 220/06 | (2006.01) | |
| B01J 20/26 | (2006.01) | |
| C08F 2/44 | (2006.01) | |
| C08J 3/12 | (2006.01) | |
| C08J 9/14 | (2006.01) | |
| C08J 9/16 | (2006.01) | |
| C08J 9/28 | (2006.01) | |
| C08L 23/02 | (2006.01) | |
| C08L 25/02 | (2006.01) | |
| C08L 27/02 | (2006.01) | |
| C08L 31/04 | (2006.01) | |
| C08L 33/08 | (2006.01) | |
| C08L 33/20 | (2006.01) | |

(52) U.S. Cl.
CPC .............. *B01J 20/261* (2013.01); *C08F 2/44* (2013.01); *C08F 220/06* (2013.01); *C08J 3/12* (2013.01); *C08J 9/14* (2013.01); *C08J 9/16* (2013.01); *C08L 23/02* (2013.01); *C08L 25/02* (2013.01); *C08L 27/02* (2013.01); *C08L 31/04* (2013.01); *C08L 33/08* (2013.01); *C08L 33/20* (2013.01); *B01J 2220/68* (2013.01); *C08L 2207/53* (2013.01); *C08L 2312/00* (2013.01)

(58) Field of Classification Search
CPC .............. C08F 220/06; C08J 9/28; C08J 9/14
See application file for complete search history.

(56) References Cited

U.S. PATENT DOCUMENTS

| | | |
|---|---|---|
| 9,375,507 B2 | 6/2016 | Tian et al. |
| 11,020,725 B2 * | 6/2021 | Kim .................. B01J 20/3293 |
| 11,186,668 B2 * | 11/2021 | Yoon ...................... C08J 9/28 |
| 2005/0137546 A1 | 6/2005 | Joy et al. |
| 2006/0020049 A1 | 1/2006 | Champ et al. |
| 2007/0088093 A1 | 4/2007 | Joy et al. |
| 2009/0191408 A1 | 7/2009 | Tian et al. |
| 2012/0001122 A1* | 1/2012 | Wattebled ............ C08F 2/44 |
| | | 252/194 |
| 2012/0309619 A1 | 12/2012 | Kwon et al. |
| 2016/0361704 A1 | 12/2016 | Won et al. |
| 2017/0066862 A1 | 3/2017 | Matsumoto et al. |
| 2018/0056274 A1 | 3/2018 | Lee et al. |
| 2018/0243464 A1 | 8/2018 | Hwang et al. |
| 2020/0239666 A1* | 7/2020 | Yoon ...................... C08K 5/01 |

FOREIGN PATENT DOCUMENTS

| | | |
|---|---|---|
| CN | 1889987 A | 1/2007 |
| CN | 102361653 A | 2/2012 |
| CN | 102617781 A | 8/2012 |
| CN | 102844340 A | 12/2012 |
| CN | 103183764 A | 7/2013 |
| CN | 104974312 A | 10/2015 |
| JP | 2007514833 A | 6/2007 |
| JP | 2012522880 A | 9/2012 |
| KR | 20050071558 A | 7/2005 |
| KR | 20150116418 A | 10/2015 |
| KR | 20160128350 A | 11/2016 |
| KR | 101700586 B1 | 1/2017 |
| KR | 20170108607 A | 9/2017 |

(Continued)

OTHER PUBLICATIONS

Extended European Search Report including Written Opinion for Application No. EP19897420.6, dated Mar. 26, 2021, pp. 1-5.
Search Report dated Feb. 22, 2022 from the Office Action for Chinese Application No. 201980017590.X dated Mar. 4, 2022, 3 pgs.
International Search Report for Application No. PCT/KR2019/017396 dated Apr. 3, 2020, 3 pages.
Odian, Principles of Polymerization, Second Edition, Copyright 1981 by John Wiley & Sons, Inc, p. 203.
Schwalm, UV Coatings; Basics, Recent Developments and New Applications, Dec. 21, 2006, p. 115, Elsevier Science.

*Primary Examiner* — Caixia Lu

(74) *Attorney, Agent, or Firm* — Lerner David LLP

(57) ABSTRACT

Provided is a method of preparing a superabsorbent polymer. More specifically, provided is a method of preparing a superabsorbent polymer capable of exhibiting improved initial absorbency and a rapid absorption rate by polymerizing monomers having acidic groups, of which part is neutralized with a basic material including potassium hydroxide, in the presence of an encapsulated foaming agent.

10 Claims, No Drawings

(56) References Cited

FOREIGN PATENT DOCUMENTS

| | | | |
|---|---|---|---|
| KR | 20170111295 | A | 10/2017 |
| WO | 2013162255 | A2 | 10/2013 |
| WO | 2015016643 | A1 | 2/2015 |

* cited by examiner

METHOD OF PREPARING SUPERABSORBENT POLYMER

CROSS-REFERENCE TO RELATED APPLICATIONS

The present application is a national phase entry under 35 U.S.C. § 371 of International Application No. PCT/KR2019/017396, filed Dec. 10, 2019, which claims priority from, Korean Patent Application No. 10-2018-0158524, filed Dec. 10, 2018, and Korean Patent Application No. 10-2019-0163106, filed Dec. 9, 2019, the disclosures of which are hereby incorporated by reference herein in their entirety.

FIELD OF THE INVENTION

The present invention relates to a method of preparing a superabsorbent polymer. More particularly, the present invention relates to a method of preparing a superabsorbent polymer exhibiting high absorbency and a rapid absorption rate.

BACKGROUND OF THE INVENTION

A superabsorbent polymer (SAP) is a synthetic polymeric material capable of absorbing moisture from 500 to 1000 times its own weight. Various manufacturers have denominated it as different names, such as SAM (Super Absorbency Material), AGM (Absorbent Gel Material), etc. Since such superabsorbent polymers started to be practically applied in sanitary products, now they have been widely used for water retaining soil products for gardening, water stop materials for the civil engineering and construction, sheets for raising seedling, fresh-keeping agents for food distribution fields, materials for poultice or the like.

These superabsorbent polymers are the most widely used in the fields of sanitary materials such as diapers, sanitary pads, etc. In the sanitary materials, the superabsorbent polymer is generally distributed throughout pulp. Recently, continuous efforts have been made to provide sanitary materials such as diapers having a thinner thickness, etc., and as part of that, diapers having a reduced content of pulp, and furthermore, diapers having no pulp, so-called pulpless diapers, are actively under development.

Such a sanitary material having a reduced content of pulp or having no pulp includes the superabsorbent polymer at a relatively high ratio. In this case, the superabsorbent polymer particles are inevitably included as multiple layers in the sanitary materials. In order to allow overall superabsorbent polymer particles included as multiple layers to more efficiently absorb a liquid such as urine, it is necessary for the superabsorbent polymer to basically exhibit high absorption performance and absorption rate.

To this end, a method of using a carbonate-based foaming agent, which is an inorganic foaming agent, has been reported. However, use of the carbonate-based foaming agent generates problems that apparent density is lowered and a large amount of fine particles is generated in a pulverization step which is required in a process of preparing the superabsorbent polymer. Therefore, a technology for preparing superabsorbent polymers exhibiting improved absorbency and a rapid absorption rate at the same time has been continuously developed.

SUMMARY OF THE INVENTION

Technical Problem

Accordingly, the present disclosure is to provide a method of preparing a superabsorbent polymer capable of exhibiting improved 1 min-absorbency and a rapid absorption rate by polymerizing monomers having acidic groups, of which part is neutralized with a basic material including potassium hydroxide, in the presence of an encapsulated foaming agent.

Technical Solution

To achieve the above object, the present disclosure provides a method of preparing a superabsorbent polymer, the method including the following steps of:

preparing a monomer composition by mixing a water-soluble ethylenically unsaturated monomers including (meth)acrylic acid with a basic material including potassium hydroxide, an encapsulated foaming agent, an internal crosslinking agent, and a polymerization initiator, wherein at least part of the acidic groups of the water-soluble ethylenically unsaturated monomers is neutralized with the basic material including potassium hydroxide;

forming a water-containing gel polymer by performing thermal polymerization or photo-polymerization of the monomer composition;

forming a base polymer in the form of power by drying and pulverizing the water-containing gel polymer; and forming a surface-crosslinked layer by additionally crosslinking the surface of the base polymer in the presence of a surface crosslinking agent, wherein the encapsulated foaming agent has a structure including a core which contains a hydrocarbon and a shell which surrounds the core and is formed using a thermoplastic resin, and has a mean diameter of 5 μm to 30 μm before expansion and a maximum expansion ratio of 5 times to 15 times in air.

Advantageous Effects

According to a method of preparing a superabsorbent polymer according to the present disclosure, monomers having acidic groups, of which part is neutralized with a basic material including potassium hydroxide, are polymerized in the presence of an encapsulated foaming agent, thereby improving initial absorbency and an absorption rate of the superabsorbent polymer.

DETAILED DESCRIPTION OF THE EMBODIMENTS

The present invention may be variously modified and have various forms, and specific embodiments will be illustrated and described in detail as follows. However, it is not intended to limit the present invention to the particular forms disclosed and it must be understood that the present invention includes every modifications, equivalents, or replacements included in the spirit and technical scope of the present invention.

Hereinafter, a method of preparing a superabsorbent polymer according to specific embodiments of the present disclosure will be described in more detail.

First, the terminology used herein is for the purpose of describing particular embodiments only and is not intended to be limiting of the invention. The singular forms used herein are intended to include plural forms as well, unless the context clearly indicates otherwise.

According to one embodiment of the present disclosure, provided is a method of preparing a superabsorbent polymer, the method including the steps of: preparing a monomer composition by mixing water-soluble ethylenically unsaturated monomers including (meth)acrylic acid with a basic material including potassium hydroxide, an encapsulated foaming agent, an internal crosslinking agent, and a polymerization initiator, wherein at least part of the acidic groups of the water-soluble ethylenically unsaturated monomers is neutralized with the basic material including potassium hydroxide; forming a water-containing gel polymer by performing thermal polymerization or photo-polymerization of the monomer composition; forming a base polymer in the form of powder by drying and pulverizing the water-containing gel polymer; and forming a surface-crosslinked layer by additionally crosslinking the surface of the base polymer in the presence of a surface crosslinking agent, wherein the encapsulated foaming agent has a structure including a core which contains hydrocarbon and a shell which surrounds the core and is formed using a thermoplastic resin, and has a mean diameter of 5 μm to 30 μm before expansion and a maximum expansion ratio of 5 times to 15 times in air.

As used herein, the term "polymer" means a polymerized state of water-soluble ethylenically unsaturated monomers, and may encompass those of all water content ranges or particle size ranges. Among the polymers, those having a water content (a moisture content) of about 40% by weight or more after being polymerized and before being dried may be designated as a water-containing gel polymer.

Further, the "superabsorbent polymer" means the polymer or base polymer itself depending on the context, or is used to encompass those made suitable for commercialization by an additional process of the polymer or the base polymer, for example, surface crosslinking, reassembling of fine particles, drying, pulverizing, size-sorting, etc.

Recently, it has been attempted to improve the absorption rate of the superabsorbent polymer, in which pores are introduced into the inside of the superabsorbent polymer using a carbonate-based foaming agent as an inorganic foaming agent during polymerization of the superabsorbent polymer, and as a result, water is allowed to be rapidly absorbed into the space. However, when an excessive amount of the carbonate-based foaming agent is used in order to improve the absorption rate, there is a problem in that bulk density of the prepared superabsorbent polymer is lowered.

Accordingly, the present inventors found that when part of acidic groups (—COOH) of the water-soluble ethylenically unsaturated monomer including (meth)acrylic acid is neutralized using potassium hydroxide, instead of commonly used sodium hydroxide, in view of the fact that potassium has a higher ionization tendency than sodium, and an encapsulated foaming agent is used, proportions of a cation ($K^+$) and an anion (—$COO^-$) in the superabsorbent polymer are increased even though a small amount of the foaming agent, and thus the absorbency and absorption rate of the superabsorbent polymer may be improved at the same time, thereby completing the present disclosure.

Specifically, when the proportion of the cation ($K^+$) in the superabsorbent polymer is increased, an osmotic pressure inside the polymer may be increased, and thus the initial absorbency may be improved, and when the proportion of the anion (—$COO^-$) in the superabsorbent polymer is increased, a crosslinked structure may be expanded due to repulsion between the anions in the crosslinked structure, and thus the absorption rate may be improved.

Further, the encapsulated foaming agent used as the foaming agent in the present disclosure has a core-shell structure, in which a core contains a thermally degradable hydrocarbon and a shell composed of a thermoplastic resin is formed on the core.

Such an encapsulated foaming agent has an advantage that the foaming temperature and the size of pores formed after foaming are easily controlled, as compared with a foaming agent such as alkali metal (bi)carbonate or alkaline earth metal (bi)carbonate, or an encapsulated foaming agent obtained by encapsulating a carbonate foaming agent with a thermoplastic resin. Further, even though no surfactant is used, together with the encapsulated foaming agent, during polymerization of the water-soluble ethylenically unsaturated monomer, the shell of the core-shell structure functions to hold the vaporized hydrocarbon inside the core, thereby stabilizing the foaming bubble, and thus it is possible to introduce even distribution of the pore structure into the superabsorbent polymer.

Accordingly, the superabsorbent polymer prepared according to the method of preparing a superabsorbent polymer of one embodiment may have a rapid absorption rate while having improved initial absorbency without using a surfactant, as compared with those prepared by using a carbonate-based foaming agent or an encapsulated foaming agent obtained by encapsulating the carbonate foaming agent with a thermoplastic resin, thereby being preferably applied to sanitary products such as diapers, sanitary pads, etc.

Hereinafter, each step of the method of preparing a superabsorbent polymer of one embodiment will be described in more detail.

In the method of preparing a superabsorbent polymer of one embodiment, the step of preparing a monomer composition by mixing water-soluble ethylenically unsaturated monomers including (meth)acrylic acid with a basic material including potassium hydroxide, an encapsulated foaming agent, an internal crosslinking agent, and a polymerization initiator is first performed.

In the above step, at least part of the acidic groups of the water-soluble ethylenically unsaturated monomers, specifically, at least part of carboxylic acid groups (—COOH) which are acidic groups of (meth)acrylic acid is neutralized in the form of a carboxylate anion (—$COO^-$) by the basic material including potassium hydroxide. Therefore, in the monomer composition, at least part of the acidic groups of the water-soluble ethylenically unsaturated monomers exists in the form of a salt of a carboxylate anion (—$COO^-$) and a potassium cation ($K^+$), i.e., in the form of potassium carboxylate (—$COO^-K^+$).

Further, the above step may be performed by two stages of treating the water-soluble ethylenically unsaturated monomers including (meth)acrylic acid with the basic material including potassium hydroxide to neutralize at least part of the acidic groups of the monomers; and mixing the water-soluble ethylenically unsaturated monomers having acidic groups, of which at least part is neutralized, with the encapsulated foaming agent, the internal crosslinking agent, and the polymerization initiator to prepare the monomer composition.

The water-soluble ethylenically unsaturated monomer may be, for example, a compound represented by the following Chemical Formula 1:

$$R_1\text{—}COOM^1 \qquad \text{[Chemical Formula 1]}$$

in Chemical Formula 1,
$R^1$ is an alkyl group containing an unsaturated bond and having 2 to 5 carbon atoms, and M¹ is a hydrogen atom, a monovalent or divalent metal, an ammonium group, or an organic amine salt.

Preferably, the monomer may be one or more selected from the group consisting of acrylic acid, methacrylic acid, and a monovalent metal salt thereof, a divalent metal salt thereof, an ammonium salt thereof, and an organic amine salt thereof. As described, when acrylic acid or a salt thereof is used as the water-soluble ethylenically unsaturated monomer, it is advantageous in terms of obtaining a superabsorbent polymer having improved absorbency. In addition, the monomer may be maleic anhydride, fumaric acid, crotonic acid, itaconic acid, 2-acryloylethane sulfonic acid, 2-methacryloylethane sulfonic acid, 2-(meth)acryloylpropane sulfonic acid, 2-(meth)acrylamide-2-methyl propane sulfonic acid, (meth)acrylamide, N-substituted (meth)acrylate, 2-hydroxyethyl(meth)acrylate, 2-hydroxypropyl(meth)acrylate, methoxypolyethylene glycol (meth)acrylate, polyethylene glycol (meth)acrylate, (N,N)-dimethylaminoethyl (meth)acrylate, (N,N)-dimethylaminopropyl(meth)acrylate, etc.

Further, the basic material including potassium hydroxide may include 50 mol % to 100 mol % of potassium hydroxide and 0 mol % to 50 mol % of sodium hydroxide. In other words, when the water-soluble ethylenically unsaturated monomer is neutralized with the basic material including 50 mol % or more of potassium hydroxide, a proportion of cation in the polymer may be increased by potassium having a higher ionization tendency than sodium, as compared with those neutralized with a basic material including more than 50 mol % of sodium hydroxide. Therefore, an osmotic pressure inside the finally prepared superabsorbent polymer may be increased to improve initial absorbency. Further, the cation concentration inside the polymer may be controlled by adjusting a molar ratio of potassium hydroxide and sodium hydroxide in the basic material, thereby controlling physical properties of the superabsorbent polymer.

The basic material including potassium hydroxide may be used in an amount of 0.5 mole to 0.9 mole with respect to 1 mole of the water-soluble ethylenically unsaturated monomer. In other words, the basic material including potassium hydroxide may be used in an amount of 36 parts by weight to 65 parts by weight with respect to 100 parts by weight of the water-soluble ethylenically unsaturated monomer.

In this regard, a degree of neutralization of the water-soluble ethylenically unsaturated monomer may be 65 mol % to 75 mol %, and pH of the monomer composition including the water-soluble ethylenically unsaturated monomer having acidic groups of which at least part is neutralized may be in the range of 5 to 6.

When the degree of neutralization of the monomer is increased due to an excessively high content of the basic material, part of the neutralized monomers is precipitated, and thus polymerization may not occur readily. Furthermore, the effect of additional neutralization after initiation of surface crosslinking is substantially eliminated, so that a degree of crosslinking of the surface-crosslinked layer may not be optimized, and liquid permeability of the superabsorbent polymer may be insufficient. On the contrary, when the degree of neutralization of the monomer is decreased due to an excessively low content of the basic material, absorbency of the polymer may greatly deteriorate, the polymer may exhibit hard-to-handle properties, such as of elastic rubber, and the initial absorbency may not be improved to a desired level because it is difficult to secure a proper concentration or more of the cation in the polymer.

Therefore, the degree of neutralization of the acidic groups of the water-soluble ethylenically unsaturated monomers and pH of the monomer composition are adjusted within the above range by using the basic material in the above-described range, thereby achieving the desired crosslinking degree. As a result, it is possible to prepare a superabsorbent polymer having improved initial absorbency.

Further, the encapsulated foaming agent refers to a thermally expandable microcapsule foaming agent having a core-shell structure, and as described above, the encapsulated foaming agent has a core-shell structure, in which a core contains a hydrocarbon and a shell composed of a thermoplastic resin is formed on the core. Specifically, the hydrocarbon constituting the core is a liquid hydrocarbon having a low boiling point, which is readily vaporized by heating. Therefore, when the encapsulated foaming agent is heated, the thermoplastic resin constituting the shell softens, and at the same time, the liquid hydrocarbon of the core is vaporized, and thus the encapsulated foaming agent expands, as the pressure inside the capsule increases. As a result, bubbles having a larger size than the existing size are generated.

Therefore, the encapsulated foaming agent generates hydrocarbon gas, and it is distinct from an organic foaming agent, which generates nitrogen gas by an exothermic decomposition reaction between monomers participating in the production of a polymer, and an inorganic foaming agent, which generates carbon dioxide gas by absorbing heat generated during the production of a polymer.

Such an encapsulated foaming agent may have expansion properties which may vary depending on components constituting the core and the shell, weights of the respective components, particle sizes thereof. By adjusting these factors, it is possible to expand pores to a desired size and to control porosity of the superabsorbent polymer.

Specifically, the encapsulated foaming agent has a particle shape having a mean diameter ($D_0$) of 5 μm to 30 μm before expansion. There is a difficulty in preparing the encapsulated foaming agent having a mean diameter of less than 5 μm, and when the encapsulated foaming agent has a mean diameter of more than 30 μm, the size of pore is too large, and thus it is difficult to efficiently increase the surface area. Therefore, when the encapsulated foaming agent has the above-described mean diameter, it is determined as being suitable for achieving an appropriate pore structure in the polymer.

For example, the encapsulated foaming agent may have a mean diameter of 5 μm or more, 6 μm or more, 7 μm or more, 8 μm or more, or 10 μm or more, and 30 μm or less, 25 μm or less, 20 μm or less, 17 μm or less, 16 μm or less, or 15 μm or less before expanding.

The mean diameter ($D_0$) before expanding of the encapsulated foaming agent may be determined by measuring a diameter of each particle of the encapsulated foaming agent as a mean Feret's diameter by an optical microscope, and then calculating a mean value thereof.

In this regard, the capsule thickness of the encapsulated foaming agent may be 2 μm to 15 μm.

Further, the encapsulated foaming agent has a maximum expansion size of 20 μm to 190 μm in air. Here, "the maximum expansion size of the encapsulated foaming agent" means the diameter range of the particles belonging to the top 10% by weight of the highly expanded particles after heating the encapsulated foaming agent. There is a difficulty in preparing the encapsulated foaming agent having the maximum expansion size of less than 20 μm in air, and when the encapsulated foaming agent has the maximum expansion size of more than 190 μm, the size of pore is too large, and thus it is difficult to efficiently increase the surface area.

For example, the encapsulated foaming agent may have the maximum expansion size of 50 μm to 190 μm, or 70 μm to 190 μm, 75 μm to 190 μm, or 80 μm to 150 μm in air.

The maximum expansion size of the encapsulated foaming agent in air may be measured by applying 0.2 g of the encapsulated foaming agent on a glass petri dish, which is then left for 10 minutes on a hot plate preheated at 150° C., observing the expanded encapsulated foaming agent under an optical microscope, and measuring the diameter of the particles belonging to the top 10% by weight of the highly expanded particles as a mean Feret's diameter by an optical microscope.

The encapsulated foaming agent exhibits a maximum expansion ratio of 5 times to 15 times in air. Here, "the maximum expansion ratio of the encapsulated foaming agent" means a ratio ($D_M/D_0$) of the mean diameter ($D_M$) of particles belonging to the top 10% by weight of the highly expanded particles after heating the encapsulated foaming agent to the mean diameter ($D_0$) measured before heating the encapsulated foaming agent. When the maximum expansion ratio of the encapsulated foaming agent in air is less than 5 times, an appropriate pore structure is not formed in the superabsorbent polymer, and thus there is a problem in that it is impossible to prepare a superabsorbent polymer having improved absorbency and absorption rate at the same time even though the encapsulated foaming agent is used. When the maximum expansion ratio of the encapsulated foaming agent in air is more than 15 times, there is a problem in that the preparation is difficult in view of the above-described mean diameter of the encapsulated foaming agent before expanding. Therefore, the encapsulated foaming agent having the above-described range of the maximum expansion ratio may be determined as being suitable for forming the appropriate pore structure in the superabsorbent polymer.

For example, the maximum expansion ratio of the encapsulated foaming agent in air may be 5 times or more, 7 times or more, or 8 times or more, and 15 times or less, 13 times or less, 11 times or less, or 10 times or less.

In this regard, the mean diameter ($D_0$) measured before heating the encapsulated foaming agent may be measured as described above. Further, the mean diameter ($D_M$) of particles belonging to the top 10% by weight of the highly expanded particles after heating the encapsulated foaming agent may be measured by applying 0.2 g of the encapsulated foaming agent on a glass petri dish, which is then left for 10 minutes on a hot plate preheated at 150° C., observing the expanded encapsulated foaming agent under an optical microscope, measuring the diameter of each particle belonging to the top 10% by weight of the highly expanded particles as a mean Feret's diameter by an optical microscope, and calculating a mean value thereof.

The expansion properties of the encapsulated foaming agent will be more specified in Examples below.

The reason for measuring the maximum expansion size and the maximum expansion ratio of the encapsulated foaming agent in air is to examine whether a desired size of pores is formed in the superabsorbent polymer prepared using the encapsulated foaming agent. Specifically, the foamed shape of the foaming agent is difficult to define as one shape, because it may vary depending on the preparation conditions of the superabsorbent polymer. Therefore, the encapsulated foaming agent is first foamed in air, and then its expansion size and ratio are examined, thereby determining whether it is suitable for forming desired pores.

The hydrocarbon constituting the core of the encapsulated foaming agent may be one or more selected from the group consisting of n-propane, n-butane, iso-butane, cyclobutane, n-pentane, iso-pentane, cyclopentane, n-hexane, iso-hexane, cyclohexane, n-heptane, iso-heptane, cycloheptane, n-octane, iso-octane, and cyclooctane. Among them, hydrocarbons having 3 to 5 carbon atoms (n-propane, n-butane, iso-butane, cyclobutane, n-pentane, iso-pentane, cyclopentane) may be suitable for forming the above-described size of pores, and iso-butane may be the most suitable.

The thermoplastic resin constituting the shell of the encapsulated foaming agent may be a polymer formed from one or more monomers selected from the group consisting of (meth)acrylate, (meth)acrylonitrile, aromatic vinyl, vinyl acetate, vinyl halide, and vinylidene halide. Among them, a copolymer of (meth)acrylate and (meth)acrylonitrile may be the most suitable for forming the above-described size of pores.

Further, a foaming start temperature ($T_{start}$) of the encapsulated foaming agent may be 60° C. to 120° C., or 65° C. to 120° C., or 70° C. to 80° C., and a maximum foaming temperature ($T_{max}$) may be 100° C. to 160° C., or 105° C. to 155° C., or 110° C. to 120° C. Within the above-described range, foaming readily occurs in the subsequent thermal polymerization or drying process, thereby introducing the pore structure into the polymer. The foaming start temperature and the maximum foaming temperature may be measured by using a thermomechanical analyzer.

The encapsulated foaming agent may include the core composed of hydrocarbon in an amount of 10% by weight to 30% by weight with respect to the total weight of the encapsulated foaming agent. This range may be most suitable for forming the pore structure of the superabsorbent polymer.

As the encapsulated foaming agent, a directly prepared encapsulated foaming agent may be used, or a commercially available foaming agent satisfying the above-described conditions may be used.

Further, the encapsulated foaming agent may be used in an amount of 0.01 part by weight to 1.0 part by weight with respect to 100 parts by weight of the water-soluble ethylenically unsaturated monomer. For example, the encapsulated foaming agent may be used in an amount of 0.01 part by weight or more, 0.05 parts by weight or more, or 0.1 part by weight or more, and 1.0 parts by weight or less, or 0.8 parts by weight or less, or 0.5 parts by weight or less with respect to 100 parts by weight of the water-soluble ethylenically unsaturated monomer. If the content of the encapsulated foaming agent is too low, sufficient foaming does not occur, and thus the pore structure may not be properly formed in the polymer. If the content of the encapsulated foaming agent is too high, porosity of the polymer may be too high, and as a result, strength of the superabsorbent polymer may be weakened. In this respect, the encapsulated foaming agent may be preferably used in the above range of content.

The monomer composition according to one embodiment may not include a surfactant, as described above.

As used herein, the term 'internal crosslinking agent' is a term used to distinguish it from a surface crosslinking agent for crosslinking the surface of the base polymer, described below, and the internal crosslinking agent functions to polymerize the water-soluble ethylenically unsaturated monomers by crosslinking the unsaturated bonds thereof. The crosslinking in the above step occurs regardless of the surface or inside of the polymer. However, through the surface crosslinking process of the base polymer described below, the surface of the finally prepared superabsorbent polymer has a structure crosslinked by the surface crosslinking agent, and the inside thereof has a structure crosslinked by the internal crosslinking agent.

As the internal crosslinking agent, any compound is possible as long as it enables introduction of crosslinkage upon polymerization of the water-soluble ethylenically unsaturated monomers. Non-limiting examples of the internal crosslinking agent may include multifunctional crosslinking agents, such as N,N'-methylenebisacrylamide, trimethylolpropane tri(meth)acrylate, ethylene glycol di(meth)acrylate, polyethylene glycol(meth)acrylate, propylene glycol di(meth)acrylate, polypropylene glycol(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, ethylene glycol diglycidyl ether, propylene glycol, glycerin, or ethylene carbonate, which may be used alone or in combination of two or more thereof, but are not limited thereto. Among them, ethylene glycol diglycidyl ether may be preferably used.

The internal crosslinking agent may be used in an amount of 0.01 part by weight to 5 parts by weight with respect to 100 parts by weight of the water-soluble ethylenically unsaturated monomer. For example, the internal crosslinking agent may be used in an amount of 0.01 part by weight or more, 0.05 parts by weight or more, or 0.1 part by weight or more, and 5 parts by weight or less, 3 parts by weight or less, 2 parts by weight or less, or 1 part by weight or less with respect to 100 parts by weight of the water-soluble ethylenically unsaturated monomer. If the content of the internal crosslinking agent is too low, sufficient crosslinking does not occur, and thus it is difficult to achieve the strength at a proper level or more. If the content of the internal crosslinking agent is too high, the internal crosslinking density increases, and thus it is difficult to achieve a desired water retention capacity.

Further, the polymerization initiator may be appropriately selected depending on a polymerization method. When a thermal polymerization method is employed, a thermal polymerization initiator is used. When a photo-polymerization method is employed, a photo-polymerization initiator is used. When a hybrid polymerization method (a method of using both heat and light) is employed, both the thermal polymerization initiator and the photo-polymerization initiator may be used. However, even in the case of the photo-polymerization method, a certain amount of heat is generated by light irradiation such as ultraviolet irradiation, etc., and a certain amount of heat is generated according to the progression of the polymerization reaction, which is an exothermic reaction, and therefore, the thermal polymerization initiator may be additionally used.

The photo-polymerization initiator may be used without limitation in view of constitution as long as it is a compound capable of forming a radical by light such as ultraviolet rays.

The photo-polymerization initiator may include, for example, one or more initiators selected from the group consisting of benzoin ether, dialkyl acetophenone, hydroxyl alkylketone, phenyl glyoxylate, benzyl dimethyl ketal, acyl phosphine, and α-aminoketone. Meanwhile, specific examples of the acyl phosphine may include diphenyl(2,4,6-trimethylbenzoyl)phosphine oxide, phenylbis(2,4,6-trimethylbenzoyl)phosphine oxide, ethyl(2,4,6-trimethylbenzoyl)phenylphosphinate, etc. More various photo-polymerization initiators are well disclosed in "UV Coatings: Basics, Recent Developments and New Application (Elsevier, 2007)" written by Reinhold Schwalm, p 115, however, the photo-polymerization initiator is not limited to the above-described examples.

The photo-polymerization initiator may be included at a concentration of about 0.0001% by weight to about 2.0% by weight with respect to the monomer composition. When the concentration of the photo-polymerization initiator is too low, the polymerization rate may become slow, and when the concentration of the photo-polymerization initiator is too high, a molecular weight of the superabsorbent polymer becomes small and its physical properties may become uneven.

Further, as the thermal polymerization initiator, one or more initiators selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate (($NH_4)_2S_2O_8$), etc., and examples of the azo-based initiator may include 2,2-azobis-(2-amidinopropane) dihydrochloride, 2,2-azobis-(N,N-dimethylene)isobutyramidine dihydrochloride, 2-(carbamoylazo)isobutyronitrile, 2,2-azobis[2-(2-imidazolin-2-yl)propane]dihydrochloride, 4,4-azobis-(4-cyanovaleric acid), etc. More various thermal polymerization initiators are well disclosed in 'Principle of Polymerization (Wiley, 1981)' written by Odian, p 203, however, the thermal polymerization initiator is not limited to the above-described examples.

The thermal polymerization initiator may be included in an amount of about 0.001% by weight to about 2.0% by weight with respect to the monomer composition. If the concentration of the thermal polymerization initiator is too low, additional thermal polymerization hardly occurs, and thus the addition effect of the thermal polymerization initiator may be insignificant. If the concentration of the thermal polymerization initiator is too high, the molecular weight of the superabsorbent polymer may become low and its physical properties may become uneven.

The monomer composition may further include an additive such as a thickener, a plasticizer, a preservation stabilizer, an antioxidant, etc., if necessary.

The above-described water-soluble ethylenically unsaturated monomer may be mixed with a solvent, together with the basic material including potassium hydroxide, the encapsulated foaming agent, the internal crosslinking agent, and the polymerization initiator. Therefore, the monomer composition prepared in the above step may be in the form of being dissolved in the solvent, and a solid content in the monomer composition may be 20% by weight to 60% by weight.

As the solvent to be applicable, any solvent may be used without limitations in view of constitution as long as it is able to dissolve the above components, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, and N,N-dimethylacetamide may be used in combination.

Meanwhile, mixing of the water-soluble ethylenically unsaturated monomer including (meth)acrylic acid with the basic material including potassium hydroxide, the encapsulated foaming agent, the internal crosslinking agent, and the polymerization initiator may be performed by, but is not particularly limited to, a method commonly used in the art, for example, by agitation.

Next, the step of forming the water-containing gel polymer by thermal polymerization or photo-polymerization of the monomer composition is performed.

The step may be performed without particular limitation in view of constitution, as long as the water-containing gel polymer is formed by thermal polymerization, photo-polymerization, or hybrid polymerization of the prepared monomer composition.

Specifically, in the case of thermal polymerization, it may be carried out in a reactor like a kneader equipped with agitating spindles. The thermal polymerization may be performed at a temperature of about 80° C. or higher and lower than about 110° C. A means for raising the polymerization temperature in the above-descried range is not particularly limited. Heating may be performed by providing a heating medium or by directly providing a heat source for the reactor. The kind of the applicable heating medium may be a hot fluid, etc., such as steam, hot air, or hot oil, but is not limited thereto. The temperature of the heating medium to be provided may be properly controlled, taking into consideration the means of the heating medium, the heating rate, and the target temperature. Meanwhile, as the heat source to be directly provided, an electric heater or a gas heater may be used, but the present disclosure is not limited to these examples.

On the contrary, when the photo-polymerization is carried out, it may be carried out in a reactor equipped with a movable conveyor belt, but the above-described polymerization method is an example only, and the present disclosure is not limited to the above-described polymerization methods.

For example, when thermal polymerization is carried out by providing a hot medium to the reactor like a kneader equipped with the agitating spindles or by heating the reactor, as described above, the water-containing gel polymer discharged from an outlet of the reactor may be obtained. The water-containing gel polymer thus obtained may have a size of centimeters or millimeters, according to the type of agitating spindles equipped in the reactor. Specifically, the size of the obtained water-containing gel polymer may vary depending on a concentration of the monomer composition fed thereto, a feeding speed or the like.

Further, as described above, when the photo-polymerization is carried out in a reactor equipped with a movable conveyor belt, the obtained water-containing gel polymer may be usually a sheet-like water-containing gel polymer having a width of the belt. In this case, the thickness of the polymer sheet may vary depending on the concentration of the monomer composition fed thereto and the feeding speed, and usually, it is preferable to supply the monomer composition such that a sheet-like polymer having a thickness of about 0.5 cm to about 10 cm may be obtained. When the monomer composition is supplied to such an extent that the thickness of the sheet-like polymer becomes too thin, it is undesirable because the production efficiency is low, and when the thickness of the sheet-like polymer is more than 10 cm, the polymerization reaction may not evenly occur over the entire thickness because of the excessive thickness.

The polymerization time of the monomer composition is not particularly limited, but may be controlled to about 30 sec to 60 min.

The water-containing gel polymer obtained by the above-mentioned method may generally have a water content of about 30% by weight to about 80% by weight. Meanwhile, the "water content" as used herein means a weight occupied by water with respect to the total weight of the water-containing gel polymer, which may be a value obtained by subtracting the weight of the dried polymer from the weight of the water-containing gel polymer. Specifically, the water content may be defined as a value calculated by measuring the weight loss due to evaporation of moisture in the polymer during the process of drying by raising the temperature of the polymer through infrared heating. At this time, the water content is measured under the following drying conditions: the temperature is increased from room temperature to about 180° C. and then the temperature is maintained at 180° C., and the total drying time is set to 40 minutes, including 5 minutes for the temperature rising step.

Next, the step of forming the base polymer in the form of powder by drying and pulverizing the water-containing gel polymer is performed.

When the encapsulated foaming agent is foamed by heating for drying in the above step, the prepared base polymer has a structure in which a plurality of pores are formed inside thereof. Therefore, it is possible to prepare a superabsorbent polymer having an improved absorption rate, as compared with those prepared without using the encapsulated foaming agent.

Meanwhile, the step of forming the base polymer may include a process of coarsely pulverizing the water-containing gel polymer before drying the water-containing gel polymer, in order to increase the drying efficiency.

In this regard, a pulverizer used here is not limited by its configuration, and specifically, it may include any one selected from the group consisting of a vertical pulverizer, a turbo cutter, a turbo grinder, a rotary cutter mill, a cutter mill, a disc mill, a shred crusher, a crusher, a chopper, and a disc cutter, but is not limited to the above-described examples.

Through the coarse pulverization step, the particle diameter of the water-containing gel polymer may be controlled to about 0.1 mm to about 10 mm. Pulverization to a particle diameter of less than 0.1 mm is not technically easy due to the high water content of the water-containing gel polymer, and an agglomeration phenomenon between the pulverized particles may occur. Meanwhile, if the polymer is pulverized to a particle diameter of larger than 10 mm, the effect of increasing the efficiency in the subsequent drying step may be insignificant.

The water-containing gel polymer coarsely pulverized as above or the water-containing gel polymer immediately after polymerization without the coarse pulverizing process is subjected to a drying step. In this regard, the drying temperature may be about 60° C. to about 250° C. If the drying temperature is lower than 60° C., the drying time becomes too long and the thermoplastic resin shell of the encapsulated foaming agent is hard to soften, and thus foaming may not occur. If the drying temperature is higher than 250° C., only the polymer surface is excessively dried, and thus fine particles may be generated during the subsequent pulverization process and the physical properties of the superabsorbent polymer finally formed may be deteriorated. Therefore, the drying may be preferably performed at a temperature of about 100° C. to about 240° C., and more preferably at a temperature of about 110° C. to about 220° C.

Further, the drying time may be about 20 min to about 12 hr, in consideration of the process efficiency. For example, the drying may be performed for about 10 min to about 100 min or for about 20 min to about 60 min.

In the drying step, any drying method may be selected and used without limitation in view of constitution, as long as it is commonly used in the process of drying the water-containing gel polymer. Specifically, the drying step may be carried out by a method such as hot air supply, infrared irradiation, microwave irradiation, ultraviolet irradiation, etc. When the drying step as above is finished, the water content of the polymer may be about 0.1% by weight to about 10% by weight.

Thereafter, the dried polymer obtained through the drying step is pulverized using a pulverizer.

Specifically, the pulverizer which is used to pulverize the base polymer of the powder form such that it is composed of particles having a particle size of about 150 μm to about 850 μm may include a pin mill, a hammer mill, a screw mill, a roll mill, a disc mill, a jog mill, etc., but the present disclosure is not limited to the above-descried examples.

Next, the step of forming a surface-crosslinked layer by additionally crosslinking the surface of the base polymer in the presence of a surface crosslinking agent is performed. In this regard, the meaning of additional crosslinking of the surface of the base polymer means that the surface of each of the polymer particles constituting the base polymer of the powder form prepared in the previous step is additionally crosslinked.

The above step is to form the surface-crosslinked layer using the surface crosslinking agent in order to increase the surface crosslinking density of the base polymer, and unsaturated bonds of the water-soluble ethylenically unsaturated monomers, which remain uncrosslinked on the surface, may be crosslinked by the surface crosslinking agent, and as a result, a superabsorbent polymer having an increased surface crosslinking density may be formed. Through this heat treatment process, the surface crosslinking density, i.e., the external crosslinking density increases, whereas the internal crosslinking density does not change, and therefore, the superabsorbent polymer in which the surface-crosslinked layer is formed may have a structure in which the external crosslinking density is higher than the internal crosslinking density.

As the surface crosslinking agent, surface crosslinking agents which have been used in the preparation of the superabsorbent polymer may be used without particular limitation. For example, the surface crosslinking agent may include one or more polyols selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, and glycerol; one or more carbonate-based compounds selected from the group consisting of ethylene carbonate and propylene carbonate; epoxy compounds such as ethylene glycol diglycidyl ether, etc.; oxazoline compounds such as oxazolidinone, etc.; polyamine compounds; oxazoline compounds; mono-, di-, or polyoxazolidinone compounds; or cyclic urea compounds, etc. Preferably, those the same as the above-described internal crosslinking agent may be used, and for example, ethylene glycol diglycidyl ether may be used.

Such a surface crosslinking agent may be used in an amount of about 0.001 part by weight to about 2 parts by weight with respect to 100 parts by weight of the base polymer. For example, the surface crosslinking agent may be used in an amount of 0.005 parts by weight or more, 0.01 part by weight or more, or 0.02 parts by weight or more, and 0.5 parts by weight or less, 0.3 parts by weight or less, or 0.1 part by weight or less with respect to 100 parts by weight of the base polymer. By controlling the content range of the surface crosslinking agent within the above-described range, a superabsorbent polymer exhibiting excellent overall absorption properties may be prepared.

As the surface crosslinking agent, one or more inorganic materials selected from the group consisting of silica, clay, alumina, silica-alumina composite, titania, zinc oxide and aluminum sulfate may be further included to conduct a surface crosslinking reaction. The inorganic material may be used in the form of powder or liquid, and particularly, in the form of alumina powder, silica-alumina powder, titania powder, or a nanosilica solution. Further, the inorganic material may be used in an amount of about 0.001 part by weight to about 1 part by weight with respect to 100 parts by weight of the base polymer.

Further, a method of mixing the surface crosslinking agent with the base polymer is not limited in view of its construction. For example, a method of feeding the surface crosslinking agent and the base polymer to a reactor and mixing them with each other, a method of spraying the surface crosslinking agent onto the base polymer, or a method of mixing the base polymer and the surface crosslinking agent while continuously feeding them to a mixer which is continuously operated may be used.

When the surface crosslinking agent and the base polymer are mixed, water and methanol may be mixed together and added. When water and methanol are added, there is an advantage in that the surface crosslinking agent may be uniformly dispersed in the base polymer. Here, the amounts of the added water and methanol may be appropriately controlled so as to induce uniform dispersion of the surface crosslinking agent, to prevent agglomeration of the base polymer, and to optimize the surface penetration depth of the crosslinking agent at the same time.

The surface crosslinking process may be carried out at a temperature of about 80° C. to about 250° C. More specifically, the surface crosslinking process may be carried out at a temperature of about 100° C. to about 220° C., or about 120° C. to about 200° C. for about 20 min to about 2 hr, or about 40 min to about 80 min. When satisfying the above-described surface crosslinking process conditions, the surface of the base polymer may be sufficiently crosslinked to increase absorbency under load.

A means for raising temperature for the surface crosslinking reaction is not particularly limited. Heating may be performed by providing a heating medium or by directly providing a heat source. In this regard, the kind of the applicable heating medium may be a hot fluid, etc., such as steam, hot air, or hot oil, but is not limited thereto. The temperature of the heating medium to be provided may be properly controlled, taking into consideration the means of the heating medium, the heating rate, and the target temperature. Meanwhile, as the heat source to be directly provided, an electric heater or a gas heater may be used, but the present disclosure is not limited to the above-described examples.

Meanwhile, the above step may further include the step of size-sorting the base polymer on which the surface-crosslinked layer is formed.

The base polymer on which the surface-crosslinked layer is formed is size-sorted according to the particle size, and physical properties of the superabsorbent polymer to be finally commercialized may be managed. Through these pulverizing and size-sorting processes, the obtained superabsorbent polymer may be suitably prepared and provided such that it has a particle diameter of about 150 μm to about 850 μm. More specifically, at least about 95% by weight or more of the base polymer on which the surface-crosslinked layer is formed has a particle size of about 150 μm to about 850 μm, and the content of fine particles having a particle size of less than about 150 μm may be less than about 3% by weight.

As described, as the particle size distribution of the superabsorbent polymer is controlled within the preferred range, the superabsorbent polymer finally prepared may exhibit excellent overall physical properties. Therefore, in the size-sorting step, the polymer having a particle size of about 150 μm to about 850 μm may be sorted and commercialized.

In the method of preparing the superabsorbent polymer according to one embodiment, the kind and content of the basic material, the kind and content of the encapsulated foaming agent, the temperature and/or time conditions of the subsequent processes (drying process or surface crosslinking process) may be appropriately controlled to provide a superabsorbent polymer having a desired level of absorption rate and initial absorbency. The superabsorbent polymer may exhibit remarkably improved 1 min-absorbency and absorption rate, as compared with a superabsorbent polymer prepared using monomers partially neutralized with a basic material including no potassium hydroxide and/or a superabsorbent polymer prepared without using a foaming agent or without using a foaming agent belonging to the scope of the present disclosure.

Meanwhile, according to another embodiment of the present disclosure, provided is a superabsorbent polymer prepared by the above-described preparation method, the superabsorbent polymer having 1 min-absorbency (distilled water) of 170 g/g or more and an absorption rate of 22 sec or less, as measured by a vortex method.

The 1 min-absorbency is defined as a total weight of distilled water which is absorbed for 1 min by the superabsorbent polymer when immersed in distilled water. A method of measuring the 1 min-absorbency will be more specified in Examples below. Specifically, the 1 min-absorbency of the superabsorbent polymer may be 170 g/g or more, 175 g/g or more, or 180 g/g or more. As this value is higher, the 1 min-absorbency is more excellent. An upper limit of the 1 min-absorbency is not limited, but, for example, 250 g/g or less, 230 g/g or less, or 210 g/g or less.

Further, the absorption rate measured by the vortex method is defined as a time taken for a liquid vortex to disappear by rapid absorption, when the superabsorbent polymer is added to physiological saline, followed by stirring. A method of measuring the absorption rate will be more specified in Examples below. Specifically, the absorption rate is 22 sec or less, or 21 sec or less. As this value is lower, the absorption rate is more excellent. A lower limit of the absorption rate is theoretically 0, but, for example, 10 sec or more, 12 sec or more, or 13 sec or more.

Hereinafter, preferred examples are provided for better understanding of the present disclosure. However, the following Examples are only for illustrating the present disclosure, and the present disclosure is not limited thereto.

EXAMPLE

Preparation of Encapsulated Foaming Agent

F-36D manufactured by Matsumoto Co., Ltd, in which a core is iso-butane and a shell is a copolymer of acrylate and acrylonitrile, was prepared as an encapsulated foaming agent used in Examples. In this regard, a foaming start temperature ($T_{start}$) of F-36D was 70° C. to 80° C., and a maximum foaming temperature ($T_{max}$) was 110° C. to 120° C.

A particle diameter of the encapsulated foaming agent was measured as a mean Feret's diameter by an optical microscope. Further, a mean value of the diameters of the encapsulated foaming agents was calculated and determined as a mean diameter of the encapsulated foaming agent.

Further, to confirm the expansion properties of the encapsulated foaming agent, 0.2 g of the prepared encapsulated foaming agent was applied on a glass petri dish, and then left for 10 minutes on a hot plate preheated at 150° C. The encapsulated foaming agent was slowly expanded by heating, which was observed under an optical microscope to measure the maximum expansion ratio and the maximum expansion size of the encapsulated foaming agent in air.

The diameters of the particles belonging to the top 10% by weight of the highly expanded particles after heating the encapsulated foaming agent were measured and determined as the maximum expansion size, and a ratio ($D_M/D_0$) of the mean diameter ($D_M$) of particles belonging to the top 10% by weight of the highly expanded particles after heating the encapsulated foaming agent to the mean diameter ($D_0$) measured before heating the encapsulated foaming agent was calculated and determined as the maximum expansion ratio.

The mean diameter of the prepared encapsulated foaming agent before expanding was 13 μm, and the maximum expansion ratio in air was about 9 times, and the maximum expansion size was about 80 μm to about 150 μm.

Example 1

In a glass reactor, 100 g (1.388 mol) of acrylic acid was mixed with 121.2 g of 45% potassium hydroxide (KOH) solution (KOH 0.972 mol), 0.33 g of the prepared encapsulated foaming agent F-36D, 0.18 g of ethylene glycol diglycidyl ether as an internal crosslinking agent, 0.13 g of sodium persulfate as a thermal polymerization initiator, 0.008 g of diphenyl(2,4,6-trimethylbenzoyl)phosphine oxide as a photo-polymerization initiator, and 85.0 g of water to prepare a monomer composition having a total solid content of 44.9% by weight. In the prepared monomer composition, a degree of neutralization of the acrylic acid was 70 mol %, and pH of the composition was 5.6.

The monomer composition was fed at a speed of 500 mL/min to 2000 mL/min onto a conveyor belt having a width of 10 cm and a length of 2 m and moving at a speed of 50 cm/min. Further, polymerization reaction was allowed for 60 sec by irradiating UV at a density of 10 mW/cm² while feeding the monomer composition.

Further, a water-containing gel polymer obtained by the polymerization reaction was passed through a hole with a diameter of 10 mm using a meat chopper to prepare crumbs. Then, the crumbs were uniformly dried in a convection oven capable of shifting airflow up and down by flowing hot air at 185° C. from the bottom to the top for 20 minutes and from the top to the bottom for 20 minutes. The dried crumbs were pulverized to prepare a base polymer in the form of powder.

To 100 g of the base polymer prepared above, a mixed solution of 5.5 g of ultra-pure water, 5.0 g of methanol, 0.034 g of ethylene glycol diglycidyl ether, and 0.04 g silica (Aerosil 200, Evonik Corp.) was added and mixed for 1 min by agitation to allow surface crosslinking reaction at 180° C. for 60 min. Thereafter, the resulting product was size-sorted to obtain a superabsorbent polymer composed of particles having a mean particle size of 150 μm to 850 μm.

Example 2

A superabsorbent polymer was prepared in the same manner as in Example 1, except that a mixture of 97.0 g of 45% potassium hydroxide (KOH) solution (0.778 mol) and 24.7 g of 31.5% sodium hydroxide (NaOH) solution (0.195 mol) was used instead of 121.2 g of 45% potassium hydroxide (KOH) solution in Example 1. At this time, in the monomer composition prepared in Example 2, a degree of neutralization of acrylic acid was 70 mol %, and pH of the composition was 5.6.

Example 3

A superabsorbent polymer was prepared in the same manner as in Example 1, except that a mixture of 60.6 g of 45% potassium hydroxide (KOH) solution (0.486 mol) and 61.7 g of 31.5% sodium hydroxide (NaOH) solution (0.486 mol) was used instead of 121.2 g of 45% potassium hydroxide (KOH) solution in Example 1. At this time, in the monomer composition prepared in Example 3, a degree of neutralization of acrylic acid was 70 mol %, and pH of the composition was 5.6.

Example 4

A superabsorbent polymer was prepared in the same manner as in Example 3, except that F-65 (manufactured by MATSUMOTO) was used instead of the encapsulated foaming agent F-36D in Example 3. At this time, in the monomer composition prepared in Example 4, a degree of neutralization of acrylic acid was 70 mol %, and pH of the composition was 5.6.

Further, the expansion properties of the encapsulated foaming agent F-65 were examined as in F-36D, and as a result, its mean diameter was 15 μm, and its maximum expansion ratio in air was about 6 times, and its maximum expansion size was about 70 μm to about 110 μm.

Example 5

A superabsorbent polymer was prepared in the same manner as in Example 3, except that 0.4 g of F-36D was used in Example 3. At this time, in the monomer composition prepared in Example 5, a degree of neutralization of acrylic acid was 70 mol %, and pH of the composition was 5.6.

Comparative Example 1

A superabsorbent polymer was prepared in the same manner as in Example 1, except that 123.5 g of 31.5% sodium hydroxide (NaOH) solution (0.972 mol) was used instead of 121.2 g of 45% potassium hydroxide (KOH) solution in Example 1. At this time, in the monomer composition prepared in Comparative Example 1, a degree of neutralization of acrylic acid was 70 mol %, and pH of the composition was 5.6.

Comparative Example 2

A superabsorbent polymer was prepared in the same manner as in Example 3, except that the encapsulated foaming agent F-36D was not used in Example 3. At this time, in the monomer composition prepared in Comparative Example 2, a degree of neutralization of acrylic acid was 70 mol %, and pH of the composition was 5.6.

Comparative Example 3

A superabsorbent polymer was prepared in the same manner as in Example 3, except that a sodium bicarbonate ($NaHCO_3$) foaming agent was used instead of the encapsulated foaming agent F-36D in Example 3. At this time, in the monomer composition prepared in Comparative Example 3, a degree of neutralization of acrylic acid was 70 mol %, and pH of the composition was 5.6.

Comparative Example 4

A superabsorbent polymer was prepared in the same manner as in Example 3, except that a foaming agent having a structure of sodium carbonate core-polyethylene glycol (PEG) shell was used instead of the encapsulated foaming agent F-36D in Example 3. At this time, in the monomer composition prepared in Comparative Example 4, a degree of neutralization of acrylic acid was 70 mol %, and pH of the composition was 5.6.

Comparative Example 5

A superabsorbent polymer was prepared in the same manner as in Example 3, except that EXPANCEL 930 DU 120 (manufactured by AkzoNobel) having a structure of hydrocarbon core-thermoplastic resin shell was used instead of the encapsulated foaming agent F-36D in Example 3. At this time, in the monomer composition prepared in Comparative Example 5, a degree of neutralization of acrylic acid was 70 mol %, and pH of the composition was 5.6.

Further, the expansion properties of EXPANCEL 930 DU 120 (manufactured by AkzoNobel) were examined as in F-36D, and as a result, its mean diameter was 33 μm, and its maximum expansion ratio in air was about 3 times, and its maximum expansion size was about 60 μm to about 150 μm.

Experimental Example

Centrifuge retention capacity (CRC), absorption rate, and 1 min-absorbency were evaluated for the superabsorbent polymers prepared in Examples and Comparative Examples by the following methods, and the results are shown in Table 1 below.

(1) Centrifuge Retention Capacity (CRC)

The water retention capacity by absorption capacity under no load was measured for each polymer in accordance with European Disposables and Nonwovens Association standard EDANA WSP 241.3.

In detail, each of the polymers obtained in Examples and Comparative Examples was classified using a sieve of #30-50. After uniformly introducing $W_0$ (g) (about 0.2 g) of the polymer in a nonwoven fabric-made bag and sealing the same, it was immersed in physiological saline (0.9 wt %) at room temperature. After 30 minutes, the bag was dehydrated by using a centrifuge at 250 G for 3 minutes, and then the weight $W_2$ (g) of the bag was measured. Further, after carrying out the same operation without using the polymer, the weight $W_1$ (g) of the bag was measured.

CRC (g/g) was calculated using the obtained weights according to the following Equation 1:

$$CRC\ (g/g) = \{[W_2(g) - W_1(g)]/W_0(g)\} - 1 \qquad \text{[Equation 1]}$$

(2) Absorption Rate by Vortex Method

The absorption rate of each of the superabsorbent polymers of Examples and Comparative Examples was measured in seconds according to the method described in International Publication WO 1987-003208.

In detail, 2 g of the superabsorbent polymer was added to 50 mL of physiological saline at 23° C. to 24° C., and stirred with a magnetic bar (diameter of 8 mm and length of 31.8 mm) at 600 rpm, and a time taken for vortex to disappear was measured in seconds to calculate the absorption rate (vortex time).

(3) 1 Min-Absorbency 1.0 g ($W_5$) of each of the superabsorbent polymers of Examples and Comparative Examples was placed into a nonwoven-fabric-made bag (15 cm×15 cm), which was immersed in 500 mL of distilled water at 24° C. for 1 minute. 1 minute later, the bag was taken from distilled water, and hung for 1 minute. Thereafter, the weight ($W_6$) of the bag was measured. Further, the same procedures were performed without the superabsorbent polymers, and the weight ($W_7$) was measured.

1 min-absorbency was calculated using the obtained weights according to the following Equation 3:

$$1\text{ min-absorbency (distilled water)} = \{[W_7(g) - W_6(g) - W_5(g)]/W_5(g)\} \quad [\text{Equation 3}]$$

TABLE 1

| | Basic material KOH/NaOH (mol %/mol %) | Kind of foaming agent | Maximum expansion ratio of foaming agent (times) | Physical properties | | |
|---|---|---|---|---|---|---|
| | | | | CRC (g/g) | Absorption rate (sec) | 1 min-absorbency (g/g) |
| Example 1 | 100/0 | F-36D | 9 | 37.0 | 15 | 209 |
| Example 2 | 80/20 | F-36D | 9 | 36.6 | 18 | 199 |
| Example 3 | 50/50 | F-36D | 9 | 36.1 | 21 | 186 |
| Example 4 | 50/50 | F-65 | 6 | 36.3 | 22 | 176 |
| Example 5 | 50/50 | F-36D | 9 | 36.0 | 19 | 191 |
| Comparative Example 1 | 0/100 | F-36D | 9 | 35.2 | 26 | 157 |
| Comparative Example 2 | 50/50 | — | — | 35.5 | 24 | 166 |
| Comparative Example 3 | 50/50 | NaHCO$_3$ | Not measureable | 35.1 | 23 | 168 |
| Comparative Example 4 | 50/50 | Core (NaCO$_3$)-Shell (PEG) | Not measureable | 35.0 | 23 | 169 |
| Comparative Example 5 | 50/50 | EXPANC EL 930 DU 120 | 3 | 35.3 | 23 | 167 |

Referring to Table 1, it was confirmed that the superabsorbent polymers of Examples exhibited remarkably improved initial absorbency and a rapid absorption rate, as compared with the superabsorbent polymer of Comparative Example 1 neutralized with only NaOH, the superabsorbent polymer of Comparative Example 2 without using the foaming agent, and the superabsorbent polymers of Comparative Examples 3 and 4 without using the encapsulated foaming agent according to the present invention.

It was also confirmed that, unlike the superabsorbent polymers of Examples using the encapsulated foaming agent having the maximum expansion ratio of 5 times to 15 times in air, the superabsorbent polymer of Comparative Example 5 using the encapsulated foaming agent having the maximum expansion ratio of 3 times in air did not show improvement in the initial absorbency and absorption rate, as compared with the superabsorbent polymer of Comparative Example 2 without using the foaming agent.

The invention claimed is:

1. A method of preparing a superabsorbent polymer, comprising:
    preparing a monomer composition by mixing water-soluble ethylenically unsaturated monomers comprising (meth)acrylic acid with a basic material comprising potassium hydroxide, an encapsulated foaming agent, an internal crosslinking agent, and a polymerization initiator, wherein at least part of the acidic groups of the water-soluble ethylenically unsaturated monomers is neutralized with the basic material comprising potassium hydroxide;
    forming a water-containing gel polymer by performing thermal polymerization or photo-polymerization of the monomer composition;
    forming a base polymer in the form of powder by drying and pulverizing the water-containing gel polymer; and
    forming a surface-crosslinked layer by additionally cross-linking a surface of the base polymer in the presence of a surface crosslinking agent,
    wherein the encapsulated foaming agent has a structure including a core which contains a hydrocarbon and a shell which surrounds the core and is formed using a thermoplastic resin, and has a mean diameter of 5 μm to 30 μm before expansion and a maximum expansion ratio of 5 times to 15 times in air.

2. The method of preparing a superabsorbent polymer of claim 1,
    wherein the basic material comprises 50 mol % to 100 mol % of potassium hydroxide and 0 mol % to 50 mol % of sodium hydroxide.

3. The method of preparing a superabsorbent polymer of claim 1,
    wherein the basic material is used in an amount of 0.5 mole to 0.9 mole with respect to 1 mole of the water-soluble ethylenically unsaturated monomer.

4. The method of preparing a superabsorbent polymer of claim 1,
    wherein a pH of the monomer composition is 5 to 6.

5. The method of preparing a superabsorbent polymer of claim 1,
wherein the encapsulated foaming agent has a maximum expansion size of 20 μm to 190 μm in air.

6. The method of preparing a superabsorbent polymer of claim 1,
wherein the encapsulated foaming agent has a foaming start temperature ($T_{start}$) of 60° C. to 120° C., and a maximum foaming temperature ($T_{max}$) of 100° C. to 160° C.

7. The method of preparing a superabsorbent polymer of claim 1,
wherein the hydrocarbon is one or more selected from the group consisting of n-propane, n-butane, iso-butane, cyclobutane, n-pentane, iso-pentane, cyclopentane, n-hexane, iso-hexane, cyclohexane, n-heptane, iso-heptane, cycloheptane, n-octane, iso-octane, and cyclooctane.

8. The method of preparing a superabsorbent polymer of claim 1,
wherein the thermoplastic resin is a polymer formed from one or more monomers selected from the group consisting of (meth)acrylate, (meth)acrylonitrile, aromatic vinyl, vinyl acetate, vinyl halide, and vinylidene halide.

9. The method of preparing a superabsorbent polymer of claim 1,
wherein the encapsulated foaming agent is used in an amount of 0.01 parts by weight to 1.0 parts by weight with respect to 100 parts by weight of the water-soluble ethylenically unsaturated monomer.

10. The method of preparing a superabsorbent polymer of claim 1,
wherein the prepared superabsorbent polymer has a 1 min-absorbency of 170 g/g or more, and an absorption rate of 22 sec or less, measured by a vortex method.

* * * * *